United States Patent [19]

Smith

[11] 4,242,827

[45] Jan. 6, 1981

[54] FISHING LURE

[75] Inventor: Wyatt B. Smith, Crosbyton, Tex.

[73] Assignee: Doyle A. Reddig, Crosbyton, Tex. ; a part interest

[21] Appl. No.: 31,405

[22] Filed: Apr. 19, 1979

[51] Int. Cl.³ .............................................. A01K 85/00
[52] U.S. Cl. .................... 43/42.1; 43/42.24; 43/42.22
[58] Field of Search ............... 43/42.1, 42.24, 42.35, 43/42.41, 43.14, 42.02, 42.36, 42.22, 42

[56] References Cited

U.S. PATENT DOCUMENTS

| | | | |
|---|---|---|---|
| 1,777,004 | 9/1930 | Lemere | 43/42.24 |
| 3,091,884 | 6/1963 | Brownstein | 43/42.36 |
| 3,203,132 | 8/1965 | Kotis | 43/42.36 X |
| 3,221,436 | 12/1965 | Mikus | 43/42.35 |
| 3,680,247 | 8/1972 | McKenzie | 43/42.36 |
| 4,064,646 | 12/1977 | Vercellone | 43/42.41 |

FOREIGN PATENT DOCUMENTS

| | | | |
|---|---|---|---|
| 85156 | 5/1965 | France | 43/42.24 |
| 1493780 | 9/1967 | France | 43/42.24 |
| 1544293 | 10/1968 | France | 43/42.1 |
| 619312 | 4/1961 | Italy | 43/42.24 |

*Primary Examiner*—Nicholas P. Godici
*Attorney, Agent, or Firm*—Wendell Coffee

[57] ABSTRACT

A fishing lure is made with a spring steel strip about 0.01"×3/16"×6". A 1/16" wire is attached to the front and rear to provide means for attaching a fishing line in front and a treble hook in rear. The strip is covered by a rubber tube or sleeve which is plugged around the wire in the front and the rear to form an air compartment and the rubber tube extends back to the treble hook to the cover the points thereof and also to form a stink bait compartment. The depth which the lure runs is dependent upon buckshot attached to the front or inflation of the tube by an air valve.

18 Claims, 7 Drawing Figures

U.S. Patent  Jan. 6, 1981  4,242,827
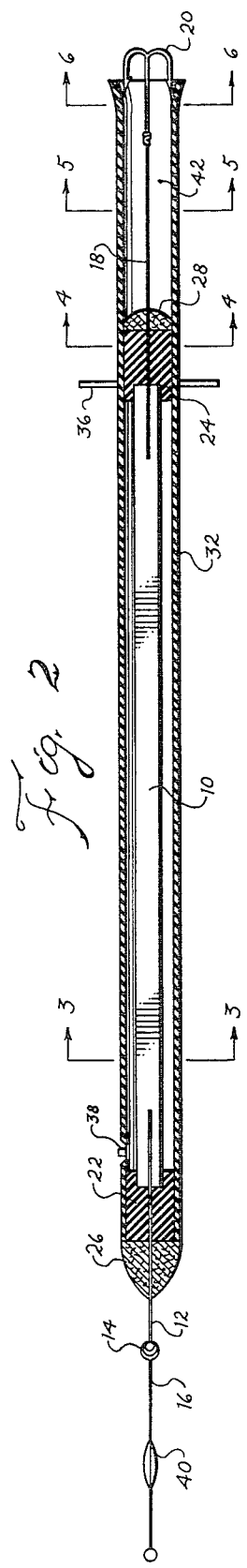
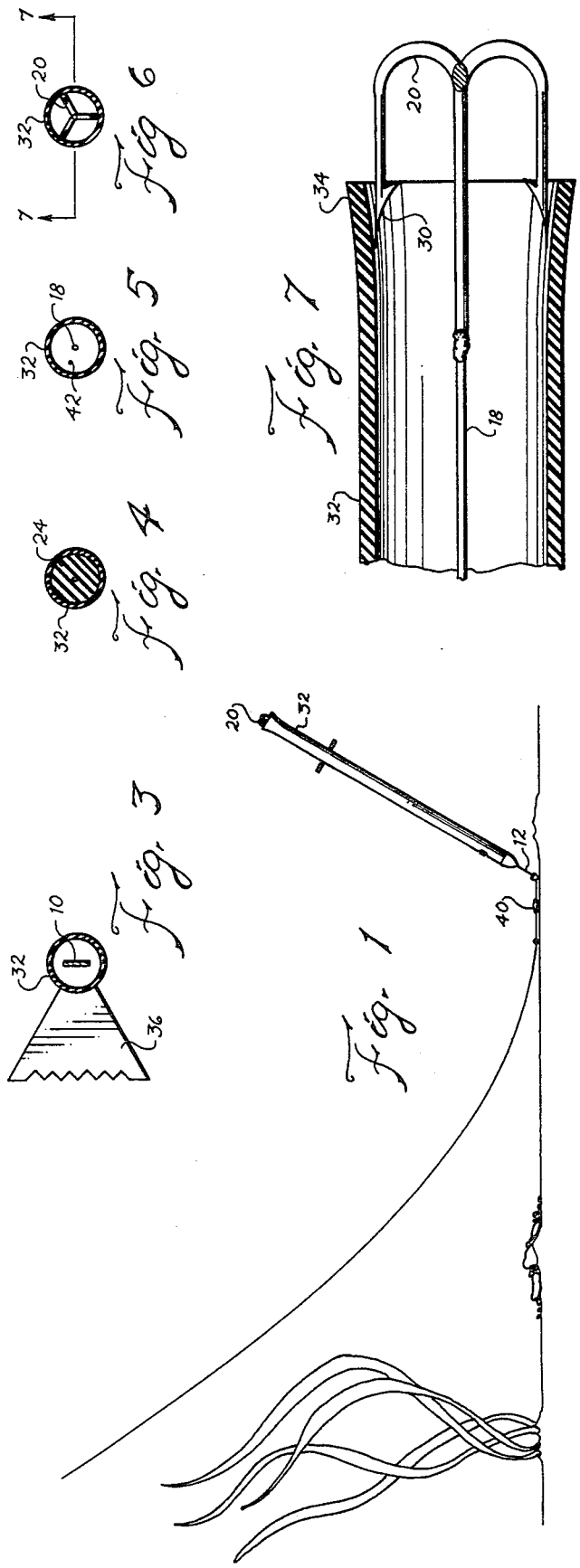

FISHING LURE

BACKGROUND OF THE INVENTION

(1) Field of the Invention

This invention relates to fishing with artificial bait and more particularly to a lure having a hook and line connection extending through a flexible body which guards the hook.

(2) Description of the Prior Art

Before this application was filed, the applicant had a search of the prior art made. This search disclosed the following U.S. Pat. Nos.: 1,777,004 to Lemere et al., 2,703,945 to Johnson, 2,983,065 to Ferguson et al., 3,440,756 to Leadbetter, 3,885,340 to Volenec, 3,983,655 to Kolesar, 4,068,400 to McCoy.

VOLENEC discloses a lure having a sleeve with a metal pin extending through it. The pin is distorted and straightens out in the water. The pin is circular. The fishing line is attached to the front of the pin and the hook to the rear of the pin.

LEMERE ET AL. discloses a lure with a flat strip of metal which is non-resilient. I.e., the strip of metal is bent to a particular or peculiar shape and it retains the shape to which it is bent.

MCCOY discloses a lure having the connection from the fishing line to the hook extending through a tube. He also discloses a treble hook which is protected by projections from the tube.

The other patents do not appear to applicant to be as pertinent as the ones discussed above.

SUMMARY OF THE INVENTION

(1) New and Different Functions

I have discovered that a thin elongated flat spring steel strip extending over a substantial length of a fishing lure gives highly desirable action. The action and the movement of the lure as it moves through the water attracts the fish.

Also, I find it desirable to make this thin flat spring steel strip the main structural connection between the leader and swivel at the front of the lure and the treble hooks at the rear of the lure.

In addition to this, the spring steel strip is covered with a sleeve or tube with an air valve having a cone-shaped front so that there is an air pocket and also behind the air pocket there is a stink bait compartment.

Thus, it may be seen that the functions of the combination of elements far exceeds the sum of the functions of the individual elements such as the buckshot, rubber tubes, spring steel, etc.

(2) Objects of this Invention

An object of this invention is to catch fish.

Further objects are to achieve the above with a device that is sturdy, compact, durable, lightweight, simple, safe, efficient, versatile, ecologically compatible, energy conserving, and reliable, yet inexpensive and easy to manufacture, adjust, use and maintain.

The specific nature of the invention, as well as other objects, and advantages thereof, will clearly appear from the following description and from the accompanying drawing, the different views of which are not scale drawings.

BRIEF DESCRIPTION OF THE DRAWINGS

FIG. 1 is a side elevational and perspective view of a lure which embodies my invention.

FIG. 2 is an axial sectional view of the lure.

FIG. 3 is a cross sectional view taken substantially along line 3—3 of FIG. 2.

FIG. 4 is a cross sectional view taken substantially along line 4—4 of FIG. 2.

FIG. 5 is a cross sectional view taken substantially along line 5—5 of FIG. 2.

FIG. 6 is a cross sectional view taken substantially along line 6—6 of FIG. 2.

FIG. 7 is an axial enlarged sectional view taken substantially along line 7—7 of FIG. 6.

DESCRIPTION OF THE PREFERRED EMBODIMENT

Referring to the drawings there may be seen a fish lure. The lure has as a principal element elongated thin flat spring metal strip 10. Specifically, the strip 10 is made of spring steel, however, other suitable metals could be used. I have had good success using a flat spring steel strip 10 which measures 0.01"×3/16"×5 11/16" (about 0.25 mm ×5 mm ×15 cm). It may be seen that the spring steel sip 10 is about twenty times as wide as it is thick and about thirty times as long as it is wide.

To the spring steel strip a 1/16" (1.5 mm) diameter steel front wire 12 is attached as by soldering. Swivel 14 is attached to the front wire 12. Leader 16 is attached in front of the swivel. Those familiar with fishing will understand that front wire 12, swivel 14 and leader 16 form attachment means at the front of the spring steel strip 10 for attaching a fishing line to the lure.

Short steel back wire 18, also about 1/16" (1.5 mm), is attached to the rear of the spring steel strip 10. The back wire 18 is also attached to the spring steel strip 10 as by soldering. Fish hook 20, and more preferably, a treble hook is attached to the back wire 18 as is well known.

Front plug 22 is attached over the front wire 12. As a matter of actual construction, the front plug is placed over the wire before the swivel is attached to the wire. In the same way, back plug 24 is placed over the back wire 18 before the hook 20 is attached. Cone-shaped front nose 26, of hard fiber washers material, is attached around the front wire 12 in front of the front plug 22 and rounded back washer 28 is attached around the back wire 18 behind back plug 24.

Rubber sleeve or tube 32 is placed over the lure extending from the front plug 22 back to the points 30 of the hook 20. Good success results using a tube 1/32" (about 0.8 mm) thick and about ⅜" (1 cm) in diameter. Also, good success results if the back 34 of the tube 32 is feathered or tapered and that if the tube extends about ⅛" (about 3 mm) past the points 30 of the hook 20. Overlapping the hook prevents weeds from snagging the hook but does not prevent the snaring of fish by the hook. When the fish strikes the lure, the rubber tube collapses from the hook so that the fish can be snared. Also, it will be understood that if desired stink bait can be placed in the compartment 42 formed behind the back plug 24 and back washer 28 and the treble hook 20. the front cone 26 and back washer 28 need to be attached to the wires 12 and 18 as by cement so they do not move axially or rotationally. Also, the tube 32 is attached to the cone 26 and washer 28 as well as plugs 22 and 24 so that the tube does not move relative to the spring steel strip or treble hook.

Desirable action is obtained by placing a wing or fin or tab 36 at right angles to the tube 32 over the back plug 24. By angles, is meant that it should be in a diametrical plane, which is to say, a plane that is at right angles to the length of the elongated spring steel strip 10. Also, it may be seen that the tab 36, preferably made of pliable rubber, extends out from the flat side of the spring steel strip 10.

Air valve 38 is located in the tube 32 within the air pocket, i.e., within that part of the tube between the front and back plugs.

Those having ordinary skill in the fishing art will understand that split buckshot 40 may be placed upon the leader 16 to hold the front of the lure down. By changing the amount of buckshot 40 that is placed upon the leader 16, the depth at which the lure runs can be adjusted as it is pulled through the water. Sufficient buckshot can cause the lure to rest upon the bottom and extend up at about a 45° angle, which with stink bait in the stink bait compartment 42 behind the back plug 24 attracts catfish very well. If it is desired that the plug run higher, either the split buckshot 40 can be lessened along the leader 16 or the air compartment inflated by the air valve 38.

Also, those skilled fishermen will understand that the exterior of the lure can be colored any desired color and that in addition to the tab 36 also lizard legs, frog shape or fish shape can be added. In addition, a buck tail may be added to the center of the treble hook 20.

Furthermore, although good success results using a lure built according to the specific dimensions set out above, it will be understood that the lure could be of any various lengths and diameter.

As an aid to correlating the terms of the claims to the exemplary drawing, the following catalog of elements is provided:

10 spring steel strip
12 front wire
14 swivel
16 leader
18 back wire
20 hook
22 front plug
24 back plug
26 front cone
28 back washer
30 points, hook
32 tube
34 back, tube
36 tab
38 air valve
40 buckshot
42 stink bait compartment The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. A fish lure comprising:
   a. an elongated flat spring metal strip,
   b. attachment means onto the front of the spring metal strip for attachment of a fishing line,
   c. a fish hook attached to the back of the spring metal strip, and
   d. a flexible covering surrounding the spring metal strip,
   e. said strip about twenty times as wide as it is thick and about thirty times as long as it is wide.

2. The invention as defined in claim 1 further comprising:
   f. a flat tab of flexible material attached to the lure, said tab lying in a diametrical plane, i.e., said tab being in a plane at right angles to the length of the flat spring metal strip.

3. The invention as defined in claim 2 further comprising:
   g. said spring metal strip being about 0.25 mm thick and about 5 mm wide and about 15 cm long, and furthermore
   h. said attachment means at the front including a wire attached to the front of the spring metal strip having a diameter of about 1.5 mm, and
   j. said hook attached to the back also by a wire having a diameter of about 1.5 mm attached to the spring metal strip.

4. A fish lure comprising:
   a. an elongated thin flat spring steel strip,
   b. attachment means at the front of the spring steel strip for attaching a fishing line,
   c. a fish hook attached to the back of the spring steel strip,
   d. a flexible tube surrounding the spring steel strip,
   e. a front plug at the front of the spring steel strip, and
   f. a back plug at the back of the spring steel strip,
   g. said tube sealed to said plugs to form a water tight compartment around said spring steel strip.

5. The invention as defined in claim 4 further comprising:
   e. said attachment means includes a swivel.

6. The invention as defined in claim 5 further comprising:
   f. a leader in front of the swivel,
   g. at least one split buckshot on the leader.

7. The invention as defined in claim 4 further comprising:
   e. said fish hook being a treble hook,
   f. said flexible tube extending to said treble hook, and
   g. overlapping said treble hook by about 3 mm.

8. The invention as defined in claim 4 further comprising:
   e. said strip about twenty times as wide as it is thick and about thirty times as long as it is wide.

9. The invention as defined in claim 4 further comprising:
   h. an air valve through said flexible tube between said plugs, whereby
   j. said air compartment may be inflated.

10. The invention as defined in claim 4 further comprising:
    h. said tube extending behind said back plug and open behind said back plug, thus forming a stink bait compartment behind said back plug.

11. The invention as defined in claim 4 further comprising:
    h. a flat tab of flexible material attached to the back plug, j. said tab lying in a diametrical plane, i.e., said tab being in a plane at right angles to the length of the flat spring steel strip.

12. The invention as defined in claim 11 further comprising:
   k. said strip about twenty times as wide as it is thick and about thirty times as long as it is wide.

13. The invention as defined in claim 12 further comprising:
   m. said attachment means includes a swivel.

14. The invention as defined in claim 13 further comprising:
   n. said fish hook being a treble hook,
   o. said flexible tube extending to said treble hook, and
   p. overlapping said treble hook by about 3 mm.

15. The invention as defined in claim 14 further comprising:
   q. an air valve through said flexible tube between said plugs, whereby
   r. said air compartment may be inflated.

16. The invention as defined in claim 15 further comprising:
   s. a leader in front of the swivel,
   t. at least one split buckshot on the leader.

17. The invention as defined in claim 16 further comprising:
   u. said tube extending behind said back plug and open behind said back plug, thus forming a stink bait compartment behind said back plug.

18. The invention as defined in claim 17 further comprising:
   v. said spring steel strip being about 0.25 mm thick and about 5 mm wide and about 15 cm long, and furthermore
   w. said attachment means at the front including a wire attached to the front of the spring steel strip having a diameter of about 1.5 mm, and
   x. said hook attached to the back also by a wire having a diameter of about 1.5 mm attached to the spring steel strip.

* * * * *